United States Patent [19]

Ikemoto et al.

[11] Patent Number: 4,530,253

[45] Date of Patent: Jul. 23, 1985

[54] GEAR ASSEMBLY FOR AUTOMOBILE GEAR TRANSMISSION

[75] Inventors: Kazuhito Ikemoto; Yukio Terakura; Takashi Miyake, all of Toyota, Japan

[73] Assignee: Toyota Jidosha Kabushiki Kaisha, Aichi, Japan

[21] Appl. No.: 446,053

[22] Filed: Dec. 1, 1982

[30] Foreign Application Priority Data

Dec. 23, 1981 [JP] Japan .................. 56-208532

[51] Int. Cl.³ .................................. F16H 55/18
[52] U.S. Cl. ........................... 74/440; 74/409; 192/53 F
[58] Field of Search ............. 74/409, 410, 339, 440; 192/53 F

[56] References Cited

U.S. PATENT DOCUMENTS

| | | | |
|---|---|---|---|
| 1,124,107 | 1/1915 | Bugatti | 74/409 |
| 1,619,799 | 3/1927 | Rounds et al. | 74/440 |
| 1,629,564 | 5/1927 | White | 74/440 |
| 2,663,198 | 12/1953 | Cairnes | 74/409 |
| 2,868,033 | 1/1959 | Gaither | 74/409 X |
| 2,896,466 | 7/1959 | Wiseman | 74/409 X |
| 2,966,806 | 1/1961 | Luning | 74/409 |
| 3,037,396 | 6/1962 | Martin | 74/409 |
| 3,093,007 | 6/1963 | Aebersold | 74/409 X |
| 3,373,625 | 3/1968 | Keller | 74/440 X |
| 3,496,794 | 2/1970 | Forichon | 74/440 |
| 3,638,511 | 2/1972 | Kirschner | 74/440 |
| 3,995,498 | 12/1976 | Curchod et al. | 74/440 X |

FOREIGN PATENT DOCUMENTS

| | | | |
|---|---|---|---|
| 441835 | 3/1927 | Fed. Rep. of Germany | 74/339 |
| 1921099 | 10/1970 | Fed. Rep. of Germany | 74/410 |
| 2118126 | 11/1971 | Fed. Rep. of Germany | 192/53 F |
| 473246 | 1/1915 | France | 74/440 |
| 1247385 | 10/1960 | France | 74/339 |
| 44544 | 12/1973 | Japan . | |
| 123479 | 2/1974 | Japan . | |
| 856629 | 12/1960 | United Kingdom | 74/440 |

Primary Examiner—George H. Krizmanich
Assistant Examiner—Dirk Wright
Attorney, Agent, or Firm—Parkhurst & Oliff

[57] ABSTRACT

A gear assembly for an automobile gear transmission includes a pair of driving and driven gears permanently in meshing engagement with each other, an additional gear axially slidable and rotatable on a hub projection of the driven gear and being permanently in meshing engagement with the driving gear to rotate at a gear ratio different from that of the driving and driven gears, a synchronizer mechanism assembled adjacent to the additional gear and having a spline piece fixed to the hub projection, and a compression spring in surrounding relationship with the hub projection and being engaged at its one end with the additional gear and at its other end with the spline piece to be positioned in place without provision of a conventional snap ring.

4 Claims, 1 Drawing Figure

U.S. Patent        Jul. 23, 1985        4,530,253
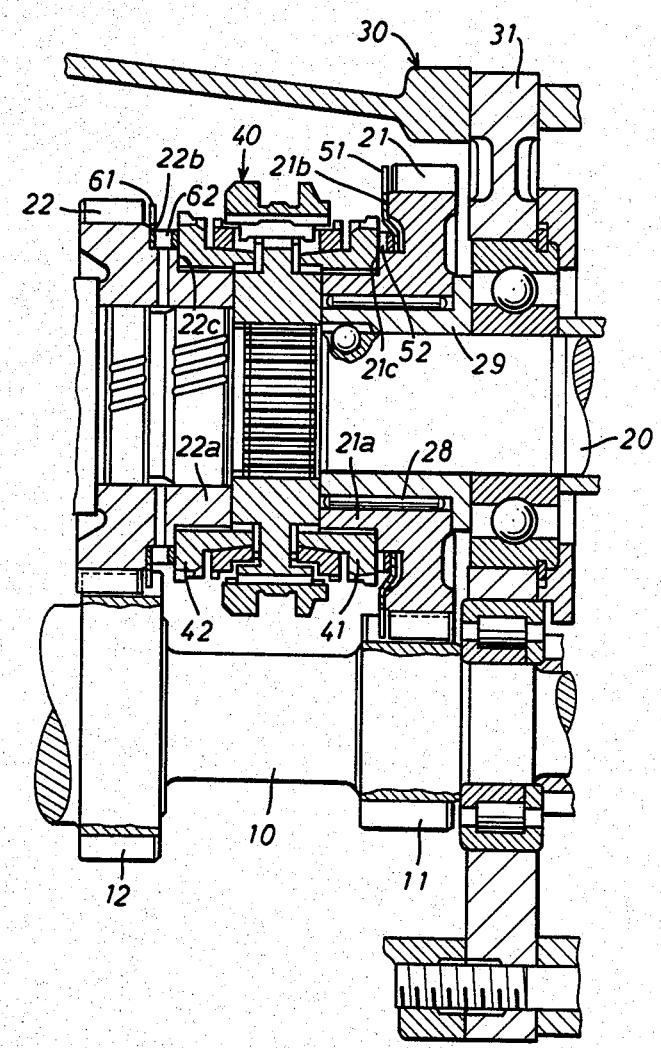

GEAR ASSEMBLY FOR AUTOMOBILE GEAR TRANSMISSION

BACKGROUND OF THE INVENTION

The present invention relates to an automobile gear transmission driven by an internal combustion engine, and more particularly to a gear assembly adapted to the gear transmission for eliminating gear knocking noises in operation.

As is well known, gear knocking noises occur in the gear transmission due to inevitable fluctuation of the engine rotation and backlash of the assembled gears. Such gear knocking noises occur most noticeably during idling of the engine when gear transmission is in neutral. For the purpose of eliminating the gear knocking noises, a gear assembly has been proposed which includes a pair of driving and driven gears permanently in meshing engagement with each other to provide a torque transmission therebetween, and an additional gear relatively rotatable at one side of either one of the gears and being permanently in meshing engagement with the other gear to rotate at a gear ratio different from that of the driving and driven gears, and in which the additional gear is resiliently in contact with one end face of the gear adjacent thereto to restrain a relative rotation between the driving and driven gears. In such a gear assembly, the additional gear is mounted on a hub projection of the gear adjacent thereto and is resiliently pressed against the one end face of the gear by engagement with a compression spring, which is arranged in surrounding relationship with the hub projection of the gear and positioned in place by a snap ring on a portion of the hub projection. For this reason, it has been necessary to provide an annular groove in a portion of the hub projection during the hub cutting process and so that the snap ring may be provided in the annular groove.

SUMMARY OF THE INVENTION

It is, therefore, a primary object of the present invention to provide an improved gear assembly capable of positioning the compression spring in place without provision of such a snap ring as described above, thereby to enhance productivity of the gear assembly.

According to the present invention there is provided an improved gear assembly of the type which includes a pair of driving and driven gears permanently in meshing engagement with each other to provide a torque transmission therebetween, an additional gear axially slidable and rotatable on a hub projection of either one of the gears and being permanently in meshing engagement with the other gear to rotate at a gear ratio different from that of the driving and driven gears, a synchronizer mechanism assembled adjacent to the additional gear and having a spline piece fixed to the hub projection of the gear, and a compression spring arranged in surrounding relationship with the hub projection of the gear and being positioned in place by engagement at its one end with the additional gear and at its other end with the spline piece to resiliently press the additional gear against one end face of the gear adjacent thereto. In actual practice, it is preferable that the compression spring is in the form of a wave-shaped ring spring interposed between the additional gear and the spline piece and that the additional gear is in the form of a plate-like gear of a pressed sheet metal.

BRIEF DESCRIPTION OF THE DRAWING

Additional objects and advantages of the present invention will be more readily apparent from the following detailed description of a preferred embodiment thereof when taken together with the accompanying drawing, in which a single FIGURE illustrates in section a gear assembly in accordance with the present invention.

DETAILED DESCRIPTION OF THE PREFERRED EMBODIMENT

Referring now to the drawing there is illustrated a gear assembly in accordance with the present invention which is adapted to a portion of an automobile gear transmission. The gear transmission includes a countershaft 10 and an output shaft 20 which are arranged in parallel with an input shaft (not shown) and rotatably supported by an intermediate plate 31 of a housing assembly 30 for the transmission. The countershaft 10 is arranged to receive an input torque thereon from an internal combustion engine by way of a clutch assembly, the input shaft and an input gear train (not shown). The countershaft 10 is provided thereon with a first driving gear 11 which is permanently in meshing engagement with a first driven gear 21 rotatable on the output shaft 20. The driven gear 21 is mounted on the output shaft 20 through a needle roller bearing 28 coupled over a collar 29. The countershaft 10 is further provided thereon with a second driving gear 12 which is permanently in meshing engagement with a second driven gear 22 rotatable on the output shaft 20. Arranged between the first and second driven gears 21, 22 is a synchronizer mechanism 40 which acts in its shifting operation selectively to connect the driven gears 21, 22 to the output shaft 20. In such an arrangement, the synchronizer mechanism 40 comprises spline pieces 41 and 42 which are respectively fixed with a press-fit to a hub projection 21a of driven gear 21 and to a hub projection 22a of driven gear 22.

Assembled between the driven gear 21 and the spline piece 41 is an additional plate-like gear 51 the tooth number of, i.e., the pitch which is different from that of the driven gear 21. The plate-like gear 51 in the form of a pressed sheet metal is axially slidable and rotatable on the hub projection 21a of driven gear 21 for relative rotation with the driven gear 21. The plate-like gear 51 is also in meshing engagement with the driving gear 11 and resiliently in contact with the left end face 21b of driven gear 21 under a pressure of a wave-shaped ring spring 52 which is arranged in surrounding relationship with the hub projection 21a of driven gear 21 and interposed between the plate-like gear 51 and the spline piece 41. Thus, the frictional engagement of plate-like gear 51 with the left end face 21b of driven gear 21 serves to eliminate knocking noises between gears 11 and 21. Assembled between the second driven gear 22 and the spline piece 42 is an additional plate-like gear 61 the tooth number i.e., the pitch, of which is different from that of the second driven gear 22. The plate-like gear 61 is axially slidable and rotatable on the hub projection 22a of driven gear 22 for relative rotation with the driven gear 22. The plate-like gear 61 is in meshing engagement with the second driving gear 12 and resiliently in contact with the right end face 22b of driven gear 22 under a pressure of a wave-shaped ring spring 62 which is arranged in surrounding relationship with the hub projection 22a of driven gear 22 and interposed between the plate-like gear 61 and the spline piece 42. Thus, the frictional engagement of plate-like gear 61 with right end face 22b of driven gear 22 serves to eliminate knocking noises between gears 12 and 22, as described in detail later.

In such a gear assembly as described above, the first driven gear 21 and the additional plate-like gear 51 are driven by the driving gear 11 during rotation of the countershaft 10 to cause a relative rotation therebetween due to the difference in their tooth numbers or gear ratios related to the driving gear 11. This gives rise to a frictional force or drag torque at the engagement face between driven gear 21 and plate-like gear 51. Similarly the second driven gear 22 and the additional plate-like gear 61 are driven by the driving gear 12 during rotation of the countershaft 10 to cause a relative rotation therebetween due to the difference in their tooth numbers or gear ratios related to the driving gear 12. This also gives rise to a frictional force or drag torque at the engagement face between driven gear 22 and plate-like gear 61. Under such operating conditions, the drag torque acts to restrain each relative rotation between gears 11 and 21 and between gears 12 and 22 caused by fluctuation of the engine rotation and backlash of the gears so as to eliminate knocking noises in operation of the gears.

During the assembling processes of the gear assembly, the plate-like gear 51 and the wave-shaped ring spring 52 are easily positioned in place by engagement with the spline piece 41 of synchronizer mechanism 40 which is fixedly coupled over the hub projection 21a of driven gear 21 without provision of a conventional snap ring, and the plate-like gear 61 and the wave-shaped ring spring 62 are also easily positioned in place by engagement with the spline piece 42 of synchronizer mechanism 40 which is fixedly coupled over the hub projection 22a of driven gear 22 without provision of a conventional snap ring. It is also noted that when the spline pieces 41, 42 are respectively fixed to the hub projections 21a, 22a, each of the wave-shaped ring springs 52, 62 can be positioned in place without intervention between a stepped portion 21c of hub projection 21a and the spline piece 41 and between a stepped portion 22c of hub projection 22a and the spline piece 42.

Although a certain specific embodiment of the present invention has been illustrated and described, it is obvious that many modifications thereof are possible. The invention, therefore, is not intended to be restricted to the exact showing of the drawing and description thereof, but is considered to include reasonable and obvious equivalents.

What is claimed is:

1. In a gear assembly having a pair of driving and driven gears permanently in meshing engagement with each other to provide a torque transmission therebetween, an additional gear axially slidable and rotatable on a hub projection of either one of said gears and being permanently in meshing engagement with the other gear to rotate at a gear ratio different from that of said driving and driven gears, a synchronizer mechanism assembled adjacent to said additional gear and having a spline piece fixed to the hub projection of said gear, and resilient means for resiliently pressing said additional gear against one end face of said gear adjacent thereto, the improvement wherein said resilient means is a compression spring arranged in surrounding relationship with the hub projection of said gear and being engaged at its one end with said additional gear and at its other end with the spline piece of said synchronizer mechanism.

2. A gear assembly as claimed in claim 1, wherein said compression spring is in the form of a wave-shaped ring spring.

3. A gear assembly as claimed in claim 1, wherein said additional gear is in the form of a plate-like gear of a pressed sheet metal.

4. A gear assembly as claimed in claim 1, wherein said additional gear is mounted axially slidably and rotatably on a hub projection of said driven gear and permanently in meshing engagement with said driving gear.

* * * * *